United States Patent [19]

Speer

[11] Patent Number: 5,344,175

[45] Date of Patent: Sep. 6, 1994

[54] RECEIVER HITCH MECHANISM FOR ELIMINATING MOVEMENT IN TRAILER HITCH RECEIVERS

[76] Inventor: William W. Speer, 1323 Eleanor Way, Sunnyvale, Calif. 94087

[21] Appl. No.: 157,677

[22] Filed: Nov. 24, 1993

[51] Int. Cl.⁵ .............................................. B60D 1/58
[52] U.S. Cl. ............................... 280/506; 280/491.5; 224/42.03 B; 224/42.03 A
[58] Field of Search .............. 280/506, 491.5, 491.1, 280/495, 500, 507; 224/42.03 A, 42.038 B, 42.03 R

[56] References Cited

U.S. PATENT DOCUMENTS

| | | | |
|---|---|---|---|
| 4,676,414 | 6/1987 | Deguevara | 224/42.03 |
| 4,856,686 | 8/1989 | Workentine | 224/42.07 |
| 4,901,896 | 2/1990 | Speer | 224/42.07 |
| 5,025,932 | 6/1991 | Jay | 224/42.03 B |
| 5,232,133 | 8/1993 | Speer | 224/42.001 |
| 5,244,133 | 9/1993 | Abbott et al. | 224/42.03 B |

FOREIGN PATENT DOCUMENTS 2026641 3/1992 Canada ................... 224/42.03 B

*Primary Examiner*—Margaret A. Focarino
*Assistant Examiner*—Kevin Hurley
*Attorney, Agent, or Firm*—Thomas E. Schatzel

[57] ABSTRACT

Receiver hitch mechanism including a receiver insert is mounted to a vehicle having a receiver type hitch. The receiver insert includes two apertures which a securing pin is indexed through. The first aperture is not within the receiver hitch and contains a threaded interior which coincides with a threaded exterior of a securing pin. The second aperture is located inside the trailer hitch and includes an interior wedge member which extends towards the interior of the receiver insert and is parallel with the securing pin. The securing pin includes one tapered end for frictional engagement with both the wedge member and the interior wall of the receiver hitch, and a second end for grasping, then rotating the securing pin. As the securing pin is rotated and tightened against the wedge member and the interior wall of the receiver hitch, the receiver insert is pressed firmly against the receiver hitch towards the side opposing the tapered securing pin end, thereby eliminating all undesired movement between the receiver insert and the receiver hitch.

10 Claims, 1 Drawing Sheet

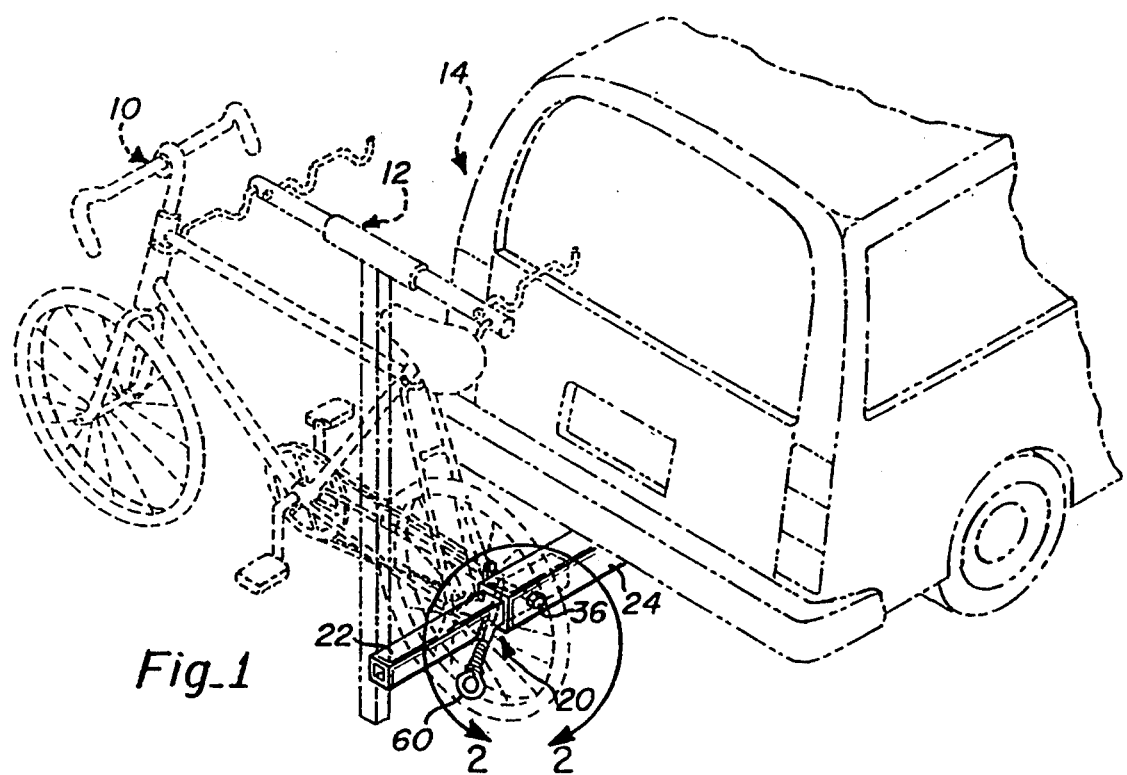
Fig_1
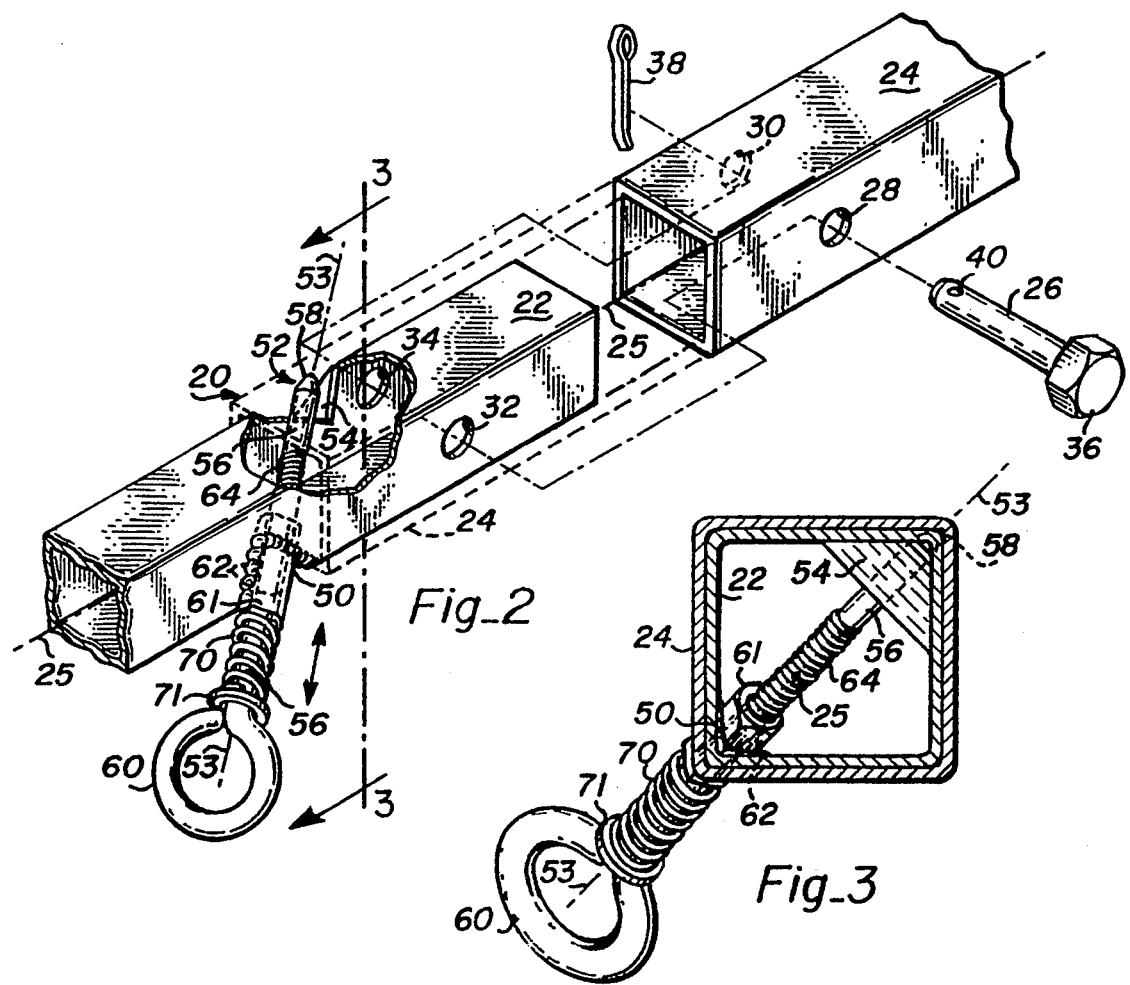
Fig_2
Fig_3

RECEIVER HITCH MECHANISM FOR ELIMINATING MOVEMENT IN TRAILER HITCH RECEIVERS

BACKGROUND OF THE INVENTION

1. Field of the Invention

This invention relates generally to receiver hitch mechanisms, attachable to a vehicle, for carrying or towing articles. More particularly, but not by way of limitation, this invention relates to a receiver insert adapted for interconnection with a conventional receiver hitch attached to a vehicle, and with adjustment means to eliminate undesirable free play between said receiver insert and said receiver hitch.

2. Description of the Prior Art

It is often desirable to carry or tow objects outside of a vehicle because the objects may be too large or burdensome to be transported inside a vehicle. A common method of transporting such articles are by using a receiver style trailer hitch. Receiver style hitches mounted to a vehicle provide for strong connections and convenient use for such purposes as towing boats, vehicles, motorcycles or trailers; and interconnections to carriers for carrying bicycles, wheelchairs, tool mounts, skis, or other cargo. Such receiver trailer hitches include a tubular receiver mounted to the vehicle for receiving a receiver insert having a corresponding elongated, tubular shape such that the insert may be slid into the receiver. The receiver insert is attached to said tubular receiver by using a locking pin which passes through said receiver and said receiver insert. However, there is usually undesirable free play between the receiver hitch and the receiver insert.

Exemplary of prior art which makes use of trailer hitch receivers are U.S. Pat. No. 4,676,414 issued to Deguevara, and U.S. Pat. No. 4,856,686 issued to Workentine. Both patents concern bicycle carriers which are mounted to a vehicle by way of the vehicle's receiver type hitch. However, neither patent is designed to eliminate the undesirable free play which may occur when said structures are connected to a vehicle's receiver hitch.

An undesirable feature of prior art structures is erratic movement caused by free play between the receiver hitch and the receiver insert. Such erratic motion may cause undesired vibration and loosening of tiedowns on carried articles; damages to articles carried; or erratic motions between a towed vehicle and the towing vehicle. Furthermore, such erratic movement is generally distracting to vehicle drivers and can cause a decrease in vehicle control. Additionally, one application of such hitches is as a foundation for a bench mounted to the trailer hitch so as to provide a worker a work bench. In such applications it is desirable that such bench be stable to permit the worker an adequate support for performing work.

SUMMARY OF THE PRESENT INVENTION

It is therefore an object of the present invention to provide a mechanism for eliminating undesirable movement between a vehicle's receiver hitch and a receiver insert interlocked within said receiver hitch.

It is another object of the present invention to provide such a mechanism that is readily attachable and detachable to a vehicle without the need for any additional tools.

It is another object of the present invention to provide such a mechanism that permits normal use of a standard pull pin or locking pull pin to connect the receiver insert with the receiver hitch.

It is another object of the present invention to provide such a mechanism that allows multiple uses for a receiver hitch by eliminating excessive movement and improving the interconnection quality.

It is another object of the present invention to provide such a mechanism that provides for increase safety when transporting items which utilize a receiver hitch.

Briefly, a preferred embodiment of the present invention includes a receiver insert attached to a receiver hitch. The receiver insert includes two apertures having a common axis aligned at an acute angle and extending through opposing walls. The first aperture is positioned so as not to be within the interior of a receiver hitch when the insert is properly aligned, while the second aperture is located within the interior of the receiver hitch. In abutment with the first aperture is an interior threaded nut aligned along the axis of the two apertures. A threaded securing pin extends through said first and second apertures and threads through the nut. One end of the securing pin is tapered on the surface for frictional engagement with both an interior wall surface of the receiver hitch and a wall surface of the insert receiver. The second end of the securing pin protrudes from the first aperture and includes a handle for grasping by an individual. After the insert is properly positioned within the receiver, upon engaging in a rotational tightening of the securing pin, the tapered end presses firmly against the interior wall of the receiver insert and the interior wall of the receiver hitch, thereby eliminating all undesired movement between the receiver insert and the receiver hitch. The securing pin is held in the desired position by locking means located around the securing pin and between the first aperture and the loop.

An advantage of the present invention is that it eliminates undesirable movement between a vehicle's receiver hitch and a receiver insert interlocked within said receiver hitch.

Another advantage of the present invention is that it provides means to be easily attached and detached from a vehicle's receiver hitch without the need for any additional tools.

Another advantage of the present invention is that it provides an apparatus that permits normal use of a standard pull pin or locking pull pin.

Another advantage of the present invention is that it provides multiple uses for a receiver hitch by eliminating excessive movement and improving the interconnection quality.

Another advantage of the present invention is that it provides for increased safety in transporting items which utilize a receiver hitch.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 1 is a perspective view of a receiver hitch mechanism of the present invention incorporated with a bike rack;

FIG. 2 is an exploded perspective view of the hitch mechanism of FIG. 1 taken along the line 2—2 of FIG. 1; and FIG. 3 is a cross-sectional view of the hitch mechanism of FIG. 2 taken along the line 3—3.

DETAILED DESCRIPTION OF THE PREFERRED EMBODIMENT

FIG. 1 shows a bicycle 10 attached to a bicycle carrier rack 12 which is attached to a vehicle 14 by means of a receiver hitch mechanism of the present invention, referred to by the general reference character 20 and enclosed within line 2—2.

FIG. 2 illustrates an exploded view of the mechanism 20 and FIG. 3 is a cross sectional view thereof taken along the line 3—3. The mechanism 20 contains a receiver insert 22 for insertion into a receiver hitch 24 of a rectangular tubular configuration. The receiver insert 22 is sized to have exterior dimensions for mating engagement within the interior opening of the hitch 24 and along a common longitudinal axis 25. The receiver insert 22 and the receiver hitch 24 are secured together by an elongated pin 26 which is indexable through a first receiver hitch aperture 28, a second receiver hitch aperture 30, a first receiver insert aperture 32, and a second receiver insert aperture 34 with the four apertures 28, 30, 32, and 34 aligned so the elongated pin 26 can slide directly through the apertures. The elongated pin 26 is secured on the entering side by a head 36 which is wider than the first receiver hitch aperture 28, and on the opposite side by a pin 38 which slides through a pin aperture 40 at the end of pin 26 projecting from the exterior of aperture 30. The length of pin 38 is longer than the diameter of aperture 30 so as to restrict the pin from longitudinal movement.

The receiver insert 22 contains a third aperture 50 and a fourth aperture 52 aligned along a longitudinal axis 53 at an acute angle relative to the longitudinal axis 25. Aperture 50 and 52 extend through opposing corners of the rectangular receiver insert 22. About aperture 52, is an interior wedge member 54 having a surface extending from the aperture 52 wall to the interior of the receiver insert 22 and adjacent to the axial line 53. A securing pin 56 extends through the aperture 50 and the aperture 52 with an end surface 58 extending through the aperture 52 being tapered for frictional engagement with an interior wall surface of the receiver hitch 24. The opposing end of the securing pin 56 protruding from the aperture 50 contains a handle in the form of a loop 60.

The receiver insert 22 further includes a threaded sleeve in the form of a nut 61 having threaded interior wall 62. The longitudinal length of nut 61 is greater than the depth of the wall of receiver insert 22 and is located at the aperture 50 in coaxial alignment with the axial line 53. The securing pin 56 has an exterior threading 64 coinciding with the threaded interior wall 62 such that the threading 62 and 64 interact. Thus the end of pin 56 carrying the end surfaces 58 is free to drift slightly.

The receiver insert 22 further includes a locking means for locking the rotational position of the securing pin 56 in the threaded interior wall 62. The illustrated locking means includes a compression spring 70 surrounding the securing pin 56 about the length of the securing pin 56 extending outside the aperture 50. One end of the compression spring 70 abuts the exterior of the nut 61 and the other end of the compression spring 70 abuts a circular shoulder 71 also abutting the handle 60.

In operation the receiver insert 22 is first interconnected with the vehicle receiver hitch 24 by sliding the receiver insert 22 along the common longitudinal axis 25 inside the opening of the receiver hitch 24 with the apertures 28, 30, 32 and 34 in alignment. Then the elongated pin 26 is slid through the aligned apertures 28, 30, 32 and 34. The pin 38 is positioned in pin aperture 40. Next, the securing pin 56 is tightened by turning the handle 60.

The securing pin 56 extends through the receiver insert apertures 50, 52 and threads 64 coinciding with the threads 62 to provide rotation, adjustment, and interlocking of the securing pin 56. The tapered surface end 58 of the securing pin 56 provides for frictional engagement with an interior corner-wall surface of the receiver hitch 24. Upon tightening the securing pin 56 by turning the handle 60, the tapered end 58 unites with an inside corner of the receiver hitch 24. Since the end surfaces 58 are free to drift slightly, they will seek out and engage the true inside corner of the receiver hitch 24. Further tightening causes it to act similar to a taper pin between the two corner walls of the receiver hitch 24 and the wedge member 54. This causes the tapered end 58 to wedge between the inside corner wall surface and the interior wedge member 54. This forces firm frictional wedging engagement of the corner of the receiver insert 22 with the interior corner of hitch 24 opposite the tapered end 58. Thus, the insert 22 and hitch receiver 24 are locked together as an unitary unit thereby eliminating undesired movement between the receiver insert 22 and the receiver hitch 24.

The locking means also locks the rotational position of the securing pin 56. The compression spring 70 surrounding the securing pin 56 is selected such that it is under compression when the surfaces 58 are about the aperture 52. Thus, the compression spring 70 prevents undesirable rotational movement of the securing pin 56 once the insert 22 and the hitch receiver 24 lock together.

The loop handle 60 allows the securing pin 56 to be rotated by hand or with an object threaded through the loop and used as a pry lever. Thus, the insert 22 and the hitch receiver 24 may be locked together and/or unlocked without the need of any special tools and in most instances merely by human hand strength such that no additional tools are needed.

Though the embodiment 20 illustrates the insert receiver 22 and the receiver hitch 24 as having a rectangular cross-section, other configurations are readily acceptable. For example, they may be in the form of a triangle, octagon, or other polygon.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alterations and modifications as fall within the true spirit and scope of the invention.

I claim:

1. A receiver hitch mechanism for mounting to a vehicle and of the type having a receiver tube extending along a longitudinal axis with an opening for receiving, a receiver insert sized for mating engagement within the receiver hitch opening and along the longitudinal axis and means for securing the receiver insert to the receiver hitch, the improvement comprising a receiver insert including a first aperture extending through a wall of the receiver insert and a second aperture extending through a wall of the receiver insert with said first and second apertures being along an axial line extending through the receiver insert;

a securing pin extending through said first and second apertures, the securing pin having a first end with a surface for frictional engagement with an interior wall surface of the receiver hitch, the securing pin having a second end protruding from the first aperture and the receiver insert; and means for adjusting the positioning of said first end.

2. The receiver insert of claim 1 wherein the securing pin has a first end with a surface for frictional engagement with both an interior wall surface of the receiver hitch and an interior wall surface of the insert receiver.

3. The receiver insert of claim 2 wherein the first and second apertures are coaxial along said axial line with said axial line being at an acute angle relative to the longitudinal axis of the receiver hitch and receiver insert.

4. The receiver insert of claim 3 further including a threaded interior wall about said first aperture.

5. The receiver insert of claim 4 further including a threaded sleeve having an interior threaded wall and positioned within said first aperture with said interior threaded wall being circular and coaxial with said axial line; and said securing pin having exterior threads for threading with said threads of the threaded sleeve.

6. The receiver insert of claim 5 further including a locking means for locking the rotational position of the securing pin in said threaded interior wall.

7. The receiver insert of claim 6 wherein, the locking means includes a compression spring surrounding the securing pin about said second end and with one end of the compression spring in abutment with the exterior of said interior wall.

8. The receiver insert of claim 7 wherein, the securing pin has a handle about said second end and in abutment with a second end of the compression spring.

9. The receiver insert of claim 8 further including a wedge member within the receiver insert positioned about said second aperture, the wedge member extending to the interior of the receiver insert and adjacent to said axial line.

10. The receiver insert of claim 9 wherein, the securing pin has a tapered end surface for interfacing with a corner interior surface of the receiver tube to increase frictional engagement between said receiver tube and said pin.

* * * * *